(12) United States Patent
Raguet et al.

(10) Patent No.: US 12,371,176 B2
(45) Date of Patent: Jul. 29, 2025

(54) ENGINE PYLON REAR SECONDARY STRUCTURE

(71) Applicant: DAHER AEROSPACE, Orly (FR)

(72) Inventors: Cyril Raguet, Castelginest (FR); Valérie Sorez, Touliuse (FR); Mathieu Zarone, Castelginest (FR)

(73) Assignee: DAHER AEROSPACE, Orly (FR)

( * ) Notice: Subject to any disclaimer, the term of this patent is extended or adjusted under 35 U.S.C. 154(b) by 0 days.

(21) Appl. No.: 18/773,868

(22) Filed: Jul. 16, 2024

(65) Prior Publication Data

US 2025/0026480 A1    Jan. 23, 2025

(30) Foreign Application Priority Data

Jul. 17, 2023 (FR) ...................... 2307655

(51) Int. Cl.
| | | |
|---|---|---|
| *B64D 27/18* | (2006.01) | |
| *B64D 27/40* | (2024.01) | |
| *B64D 29/02* | (2006.01) | |
| *B64D 29/08* | (2006.01) | |

(52) U.S. Cl.
CPC ........... *B64D 27/18* (2013.01); *B64D 27/402* (2024.01); *B64D 29/02* (2013.01); *B64D 29/08* (2013.01)

(58) Field of Classification Search
CPC ...... B64D 27/402; B64D 27/40; B64D 29/02; B64D 29/08
See application file for complete search history.

(56) References Cited

U.S. PATENT DOCUMENTS

| | | | |
|---|---|---|---|
| 2017/0211284 A1* | 7/2017 | Nguyen | B64C 1/18 |
| 2020/0070992 A1* | 3/2020 | Theron | B64D 29/06 |
| 2021/0078693 A1* | 3/2021 | Cromer | B64D 27/402 |
| 2022/0297845 A1* | 9/2022 | Pautis | B64D 29/02 |
| 2023/0202665 A1 | 6/2023 | Messina et al. | |

FOREIGN PATENT DOCUMENTS

| | | |
|---|---|---|
| FR | 3120854 A1 | 9/2022 |
| FR | 3129922 A1 | 6/2023 |

* cited by examiner

*Primary Examiner* — Nicholas McFall
*Assistant Examiner* — Eric Acosta

(57) ABSTRACT

An engine pylon rear secondary structure for an aircraft comprising an engine pylon (30) suspending an engine (20) to a wing (10), the engine pylon rear secondary structure comprising:
  a front attachment interface (310);
  an aft attachment interface (320);
  a composite beam (301) connecting the front attachment interface (310) and the aft attachment interface (320);
  the composite beam (301) comprising a first section (501) and a second section (502) integral with the first section;
  frames (330) configured for supporting fairing panels (340) and being attached to the first section (501) of the composite beam; and
  fairing panels (340) attached to outer faces of the frames;
  wherein the composite beam is of a U-shaped cross-section, the frames (330) comprising three brackets (431, 432, 433) configured to be attached to the composite beam on three external faces of the U-shaped cross-section.

10 Claims, 5 Drawing Sheets

ENGINE PYLON REAR SECONDARY STRUCTURE

CROSS-REFERENCE TO RELATED APPLICATIONS

The instant application claims priority of French application FR2307655 filed on Jul. 17, 2023, the content of which is hereby introduced by reference in its entirety.

PRIOR ART

Document FR 3 120 854 A1/US 2022/0297845 A1 discloses a cowling system for an engine pylon.

BACKGROUND OF THE INVENTION

The invention belongs to the field of aeronautical structures, more particularly that of the linkage of an engine with an aerostructure, in particular, but not exclusively, with an aircraft wing.

The rear secondary structure of an engine pylon, particularly for a jet engine, commonly referred to by the acronym RSS is an aerodynamic fairing. This substructure is attached by three anchor points between the primary structure of the pylon supporting the engine and the primary structure of the wing of the aircraft.

Its shape is substantially semi-conoidal, truncated, hollow, flared at the interface with the pylon and with a section becoming narrower, both vertically and transversely, as it moves away from the pylon towards the trailing edge to its junction with the wing.

Two other components which are also aerodynamic fairings, are assembled to this substructure: a lower fairing, commonly referred to by the acronym APF for "Aft Pylon Fairing", in the continuity of the shape of the RSS and subjected to the flow of hot gases (>170° C.) emitted by the engine and which is therefore made of materials capable of resisting heat, for example, titanium alloys, and a fairing at the end of the RSS, called a gutter which extends the conoidal shape of the RSS up to the under surface of the wing.

The two fairings, the APF and the gutter, are supported by the RSS.

The RSS being a hollow shell it may house some equipment, providing them shielding from environmental hazards like fire, lightning or impacts.

Thus, although it does not support the weight of the engine nor the transmission of the thrust, this secondary structure shall be capable of withstanding severe mechanical stresses.

In addition to aerodynamic loads during flight, the structure may withstand and maintain its integrity when subjected to strong vibrations that may be generated by the engine in the event of degraded operation following, for example, accidents such as object ingestion, breakage of rotating blades and, more generally, an imbalance of the engine spinning parts.

In order to achieve this resistance while keeping a lightweight, the rear secondary structure is, according to prior art, designed as a lattice-type set, comprising a skeleton framing consisting of frames and spars, fixed between them by rivet-type fasteners and on which are assembled panels, generally made of a monolithic composite material or made of a sandwich structure.

Because of its rigidity, such a structure cannot accommodate by its own flexibility variations in shape, inherent to any mass production process, both between the assembled elements constituting the rear secondary structure, including frames, spars, panels, and between the rear secondary structure itself and its anchor points on the pylon and the aerostructure, in particular the primary structure of the wing. The slightest deviations may lead to significant mechanical stresses during assembly, in the rear secondary structure itself and in the aerostructure to which it is assembled.

As a result, the aerodynamic shape of the fairing is simplified, selecting flat surfaces or quasi-flat surfaces with a large radius of curvature, so as to avoid creating too much of a difference in shape between the assembled parts, due to the dispersion in the manufacturing dimensions, which are always greater on parts of a more complex shape. Consequently, the aerodynamics are poor, though not simplifying assembly with the pylon and the primary structure interfaces.

The rear secondary structure including spars, frames, and panels is manufactured with precision to limit dimension dispersions and to make sure their assembly that does not generate stresses, which implies a high manufacturing cost.

Finally, the design of the skeleton framing leaves a small volume for installing equipment and makes it difficult to access the interior of the RSS for the control and maintenance of this equipment.

SUMMARY OF THE INVENTION

The deficiencies of the prior art may be solved by an engine pylon rear secondary structure for an aircraft comprising an engine pylon suspending an engine at a wing, the engine pylon rear secondary structure comprising:
- a front attachment interface, configured to be attached to a primary structure of an engine pylon;
- an aft attachment interface, configured to be attached to a primary structure of a wing;
- a composite beam connecting the front attachment interface and the aft attachment interface and attached thereto;
- the composite beam comprising a first section and a second section integral with the first section;
- the second section comprising two branches;
- the first section being connected to the aft attachment interface and the second section being connected to the front attachment interface;
- frames configured for supporting fairing panels and being attached to the first section of the composite beam; and
- fairing panels attached to the outer faces of the frames.

Thus, the composite beam, substantially Y-shaped, provides both the rigidity of the assembly on which the other means making the fairing are positioned, the frames on the beam and the panels on the frames, The beam is one-piece and precisely made, which prevents the lengthening of the chains of dimensions.

The assembly is lighter which improves its ability to withstand vibrations and the interior volume for containing equipment is increased compared to the prior art.

The rear secondary structure may be implemented according to the embodiments and variants exposed hereafter, which are to be considered individually or according to any technically operative combination.

According to some embodiment, the composite beam is of a U-shaped cross-section.

According to some embodiment, the frames comprise three brackets configured to be attached to the composite beam on three external faces of the U-shaped cross-section and an outer face configured for supporting the fairing panels.

According to some embodiment, the frames are of an overall horseshoe shape comprising a frame web and flanges, leaving a frees space inbetween inner sides of the frames webs.

According to some embodiment, the three brackets are flanges integral with a frame web.

According to some embodiment, the outer face is part of a flange integral with a frame web.

According to embodiment variants, the outer faces of the frames are configured for supporting fairing panels with a shape is selected among plan panels, panels in single curvature and panels in double curvature.

Advantageously, the U-shaped cross-section of the first section of the composite beam widens from the aft attachment interface to the second section.

Advantageously, the U-shaped cross-sections of the two branches of the second section expand towards the front attachment interface.

According to some embodiment, a first medium plane, in which the first section extends, and a second medium plane, in which the second section extends, are secant.

According to some embodiment, the composite beam is made of a composite material comprising a polymer matrix and a reinforcement comprising continuous carbon fibers.

According to some embodiment, at least part of the frames is made of a metallic material chosen among an aluminum alloy and a titanium alloy.

According to some variant, at least part of the frames is made of a composite material comprising a polymer matrix and a reinforcement comprising continuous carbon fibers.

Advantageously, at least one of the fairing panels comprises an access hatch.

BRIEF DESCRIPTION OF DRAWINGS

The technical solution may be implemented according to the nonlimiting embodiments described hereunder with reference to FIG. 1 to FIG. 7 in which.

DETAILED DESCRIPTION OF THE INVENTION

Figure 1:
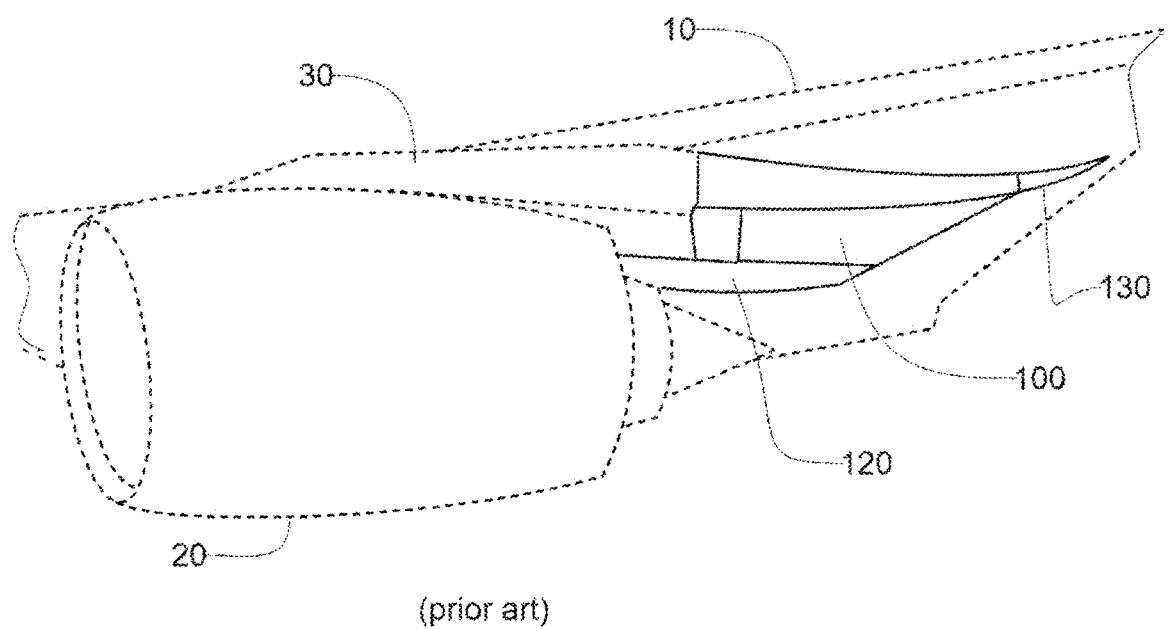
FIG. 1 relating to prior art shows in a partial perspective the positioning of an RSS on an aircraft.

FIG. 1 according to an exemplary embodiment relating to the prior art, a RSS (100), is connected on one side in the front, to a pylon (30) for suspending an engine (20) from a wing (10) of an aircraft, and on the other side in the rear, to an under side of wing (10).

Such secondary structure serves as an aerodynamic fairing and supports on a lower face a lower fairing (120), called APF, subjected to the flow of hot gases ejected by the engine (20), and a rear end fairing (130), called gutter, which terminates the aerodynamic shape dying on the intrados face of the wing (10).

Figure 2:
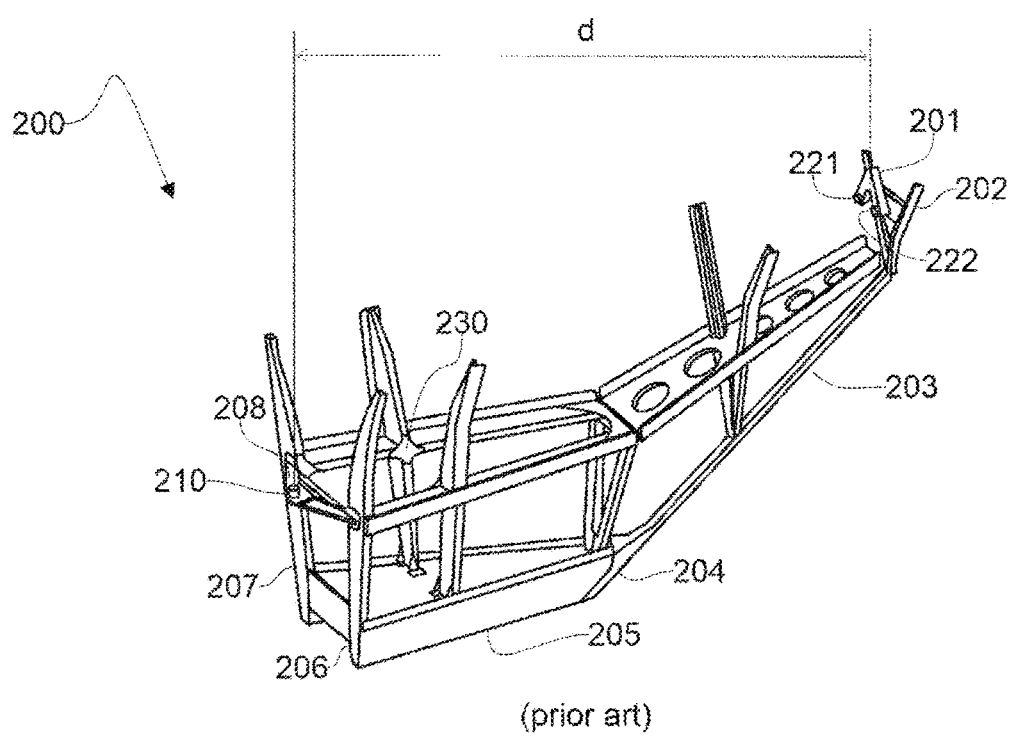
FIG. 2 relating to prior art shows in a perspective view an exemplary embodiment of a skeleton framing of a RSS.

FIG. 2 according to an exemplary embodiment of the prior art, the skeleton frame (200) of an RSS consists of a set of metal parts formed and machined, for example made of aluminum alloy, firmly assembled in particular via fittings (230) and by riveting, according to a lattice structure principle, making this structure very stiff. This rigidity is given by all the parts thus assembled, constituting a whole.

It comprises a front attachment point (210) to connect it to the engine pylon and two aft attachment points (221, 222) to connect it to a primary structure of a wing.

Panels, generally made of a sandwich type composite material, are attached to the outer faces of the frames and spars of this framework in order to form the fairing.

The presence of these structural elements leaves little room inside the framework to install equipment.

Such a design involves long dimension chains encompassing multiple members. Thus, by way of illustration, a distance d between the front and the aft attachment points (221, 222) involves at least 8 structural members (201, 202, 203, 204, 205, 206, 207, 208) and consequently depends on a sum of the manufacturing and assembly tolerances of these members. Thus, requiring precise and expensive manufacturing.

In the same way, always for illustrative purposes, a variation in this distance because of distortions during operation produces efforts that are transmitted in all these members and in particular via the structural links between them.

This requires, in particular, the implementation of assembly fittings to reinforce these connections, which increases the mass of the assembly and consequently the level of stresses generated by strong vibrations, especially in the event of an engine issue causing an imbalance of spinning parts in the engine.

Figure 3:
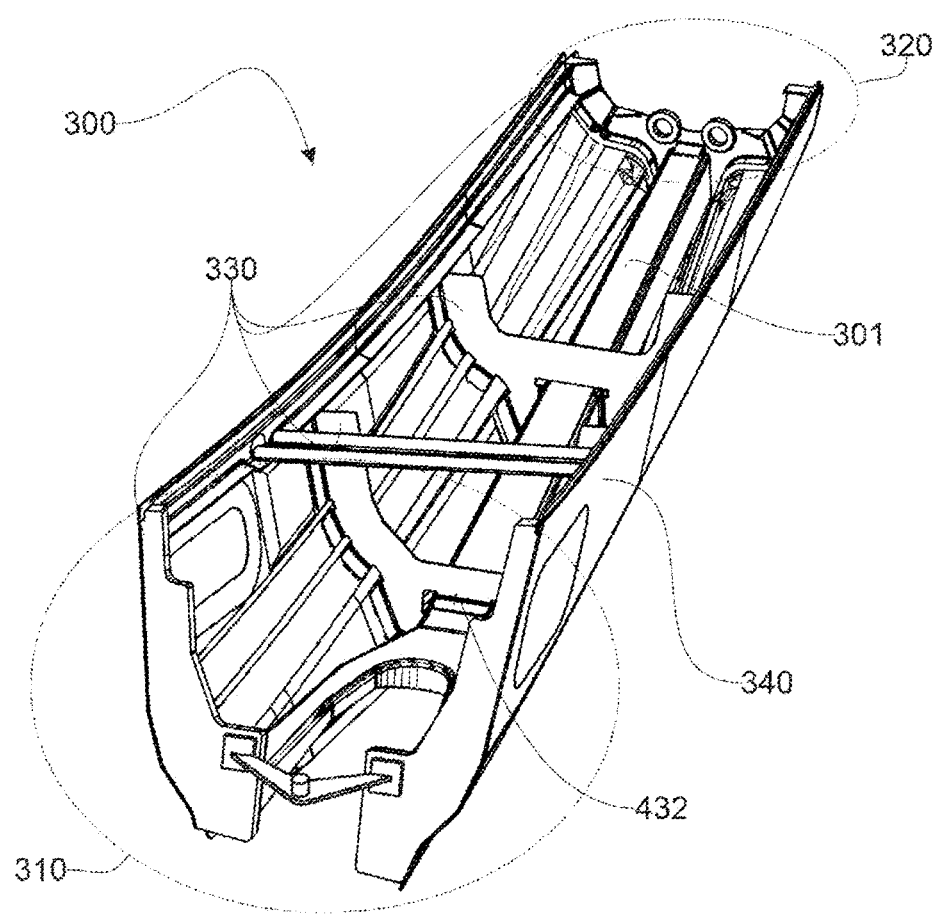
FIG. 3 shows, in a perspective view, some exemplary embodiment an RSS implementing the exposed technical solution.

FIG. 3 according to some exemplary embodiment an RSS (300) solving the shortcomings of the prior art comprises a composite beam (301) constituting a "spine" of a substructure, to which are connected:
a front attachment interface (310),
an aft attachment interface (320), and
frames (330) configured for supporting fairing panels (340).

Figure 4:
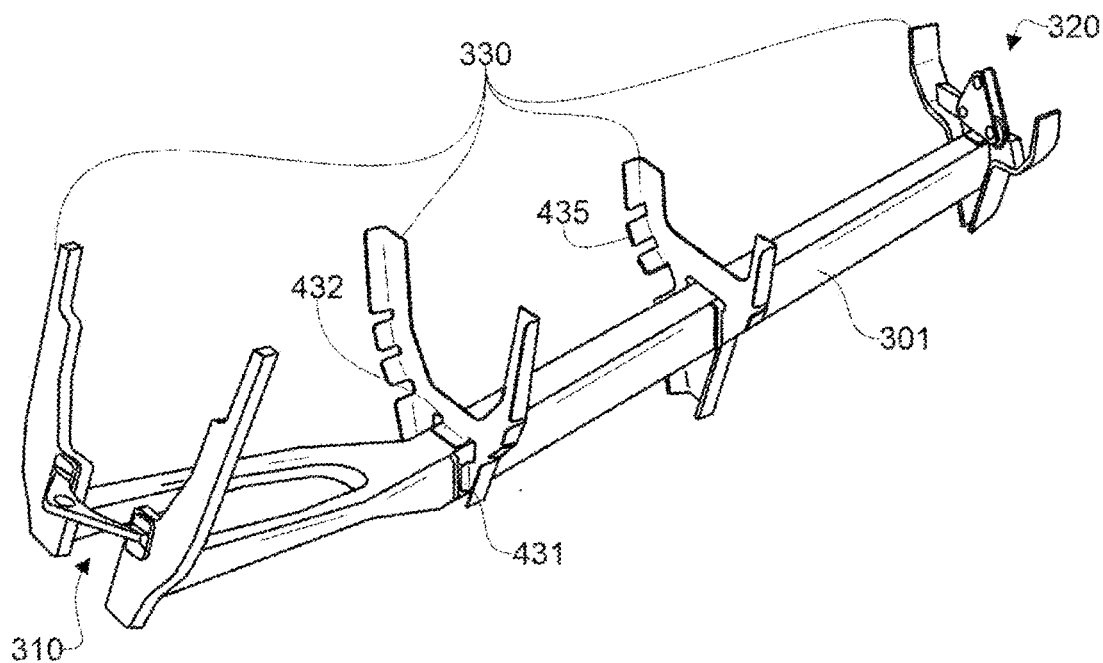
FIG. 4 shows in a perspective view an example of a skeleton framing adapted to the RSS shown in FIG. 3.

Comparing FIG. 4 with FIG. 2 highlights the simplification of the skeleton framing. The composite beam (301) is the main structural member of the skeleton framing and all the other parts, in particular the frames (330), are positioned on it.

To this end, the frames (330), here 4 frames, are each comprising three brackets (431, 432) making it possible to assemble the frames with the composite beam (301) bearing on the external faces of the beam.

Accordingly, the dimension chain is drastically reduced, and the flow of efforts is directed in the composite beam which is dimensioned accordingly.

According to some exemplary embodiment, the front attachment interface (310) and aft attachment interface (320) are respectively linked to a first frame and to a last frame.

The fairing panels are attached on outer faces (435) of the frames. The frames are here shown with a curved outer face, but the same frames architecture and the same composite beam (301) may receive frames with a planar outer face with their attachment on the composite beam remaining done by the same three brackets on the three external faces of the composite beam.

Figure 6:
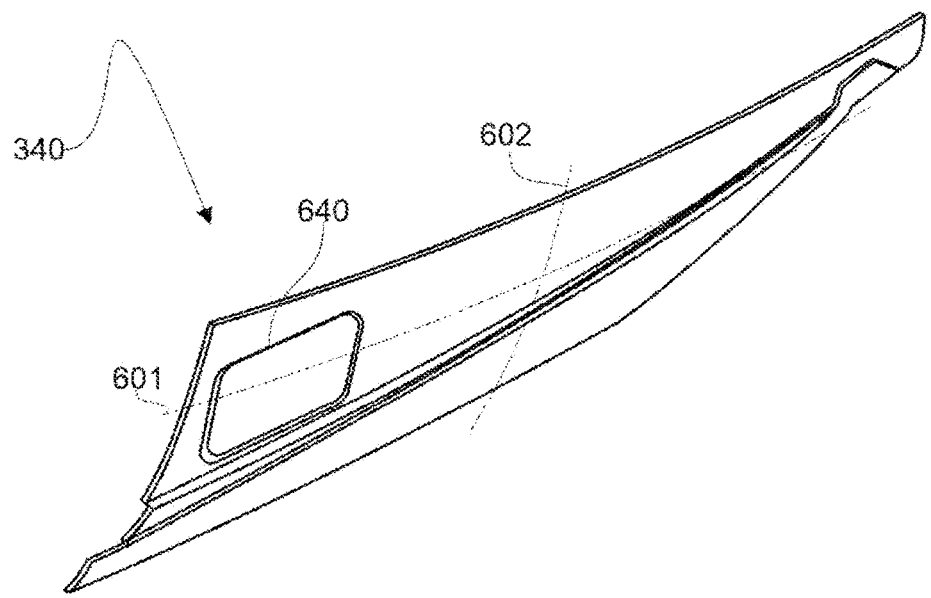
FIG. 6 shows, according to a perspective view, an example of a double-curvature fairing panel.

Thus, FIG. 6, by separating the structural function, provided by the composite beam, and the panels support function, the skeleton framing allows, without further assembly difficulty, the installation of fairing panels (340) with a double-curvature, i.e. with curvatures in at least two intersecting directions (601, 602).

This double-curvature shape of fairing panels is more effective from an aerodynamic point of view.

However, the architecture of the skeleton framing also allows the assembly of flat panels or panels of single-curvature, using frames with an appropriate outer face, e.g. for replacing an existing structure made according to prior art.

The architecture of the skeleton framing frees up space inside the RSS for the installation of equipment.

This larger free space, less cluttered by structural members compared to the prior art, allows access to all or part of this equipment without dismantling the fairing panels, which may comprise include one or more access hatches (640) for this purpose.

Figure 5:
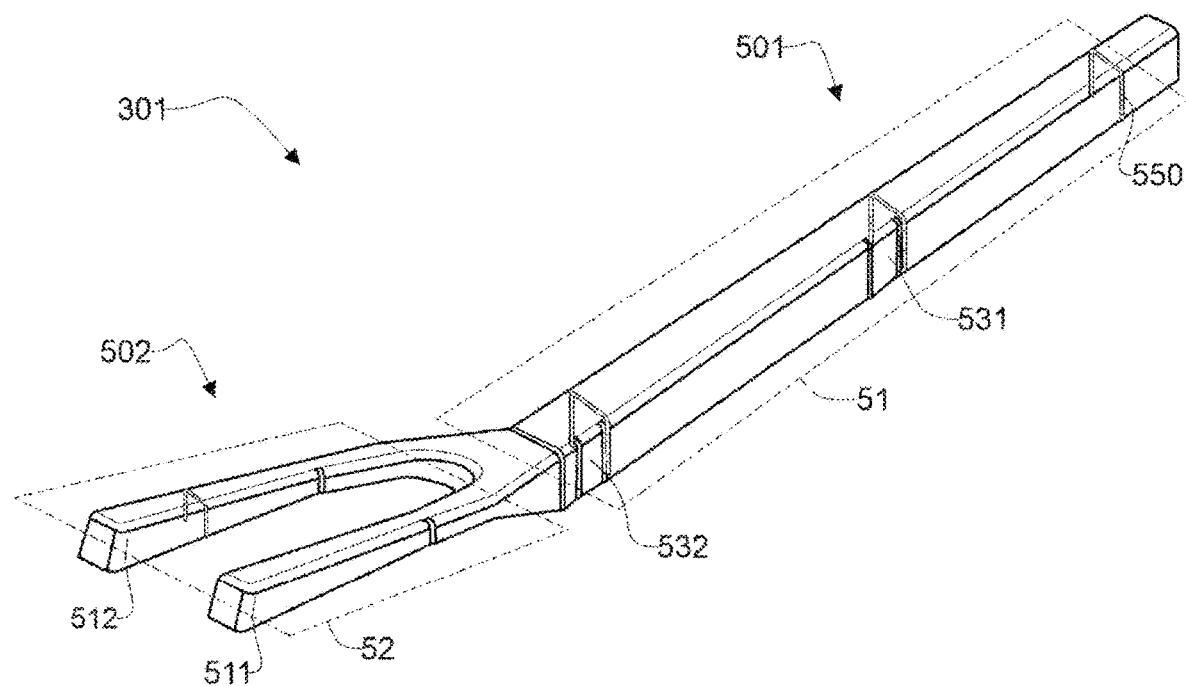
FIG. 5 is a perspective view of a composite beam of the skeleton framing shown in FIG. 4 with its cross-sections.

FIG. 5 according to some embodiment, the composite beam (301) may comprise two sections (501, 502) integral with each other, the first section extending in a first medium plane (51) the second section extending in a second medium plane (52) two medium planes (51, 52) being secant.

The second section comprises two branches (511. 512) the composite beam having an overall broken Y shape.

The composite beam may be monobloc of a U-shaped cross-section (550) with a thickness and length of the U flanges changing both in the first section and in the second section of the composite beam as well as in the two branches of the second section. In particular, the cross-sections by be thickened at the locations (531, 532) where the frames are joined with the composite beam, and the cross-sections of the two branches (511, 512) of the second section widen from the connection with the first section up to the front attachment interface. These cross-section variations may be determined by calculation by any means known to the person skilled in the art according to the loading conditions of the structure.

As a nonlimiting example, the beam is made of a thermosetting resin reinforced with continuous carbon fibers, i.e. extending continuously from one edge to the other of the beam, with a reinforcement rate comprised between 50% and 60% in mass.

Therefore, the composite beam may very resistant, rigid and light which is particularly advantageous for resisting strong vibrations.

For example, the mass of such a composite beam, within a quadratic volume of 1811×337×425 mm$^3$, with a thickness of 3.63 mm, a minimum cross-section of 551 mm$^2$ and a maximum cross-section of 883 mm2 is less than 2 kg.

The composite beam may be made by injection of a HexFlow® RTM 6 resin, marketed by Hexcel®, in a fibrous preform, for example by the RTM process ("Resin Transfer Molding"), the fibrous preform being contained in a closed mold, or any other equivalent method.

This makes it possible to create the relatively complex composite beam in a monobloc configuration, without assembly and with a reproducible make with an accuracy of less than 0.4 mm, the external faces of the beam, in particular those on which the frames will bear, being in contact with a molding surface of the closed mold.

Alternatively, the composite beam may be made of a thermoplastic polymer matrix reinforced by continuous carbon fibers.

In such a case, the composite beam may be obtained, for example, by a consolidation in shape of prepreg plies or by stamping a thermoplastic composite blank.

The frames may be made of an aluminum alloy or a titanium alloy, by forming or by machining.

Alternatively, the frames may be made of a polymer matrix composite material with fibrous reinforcement.

Figure 7:
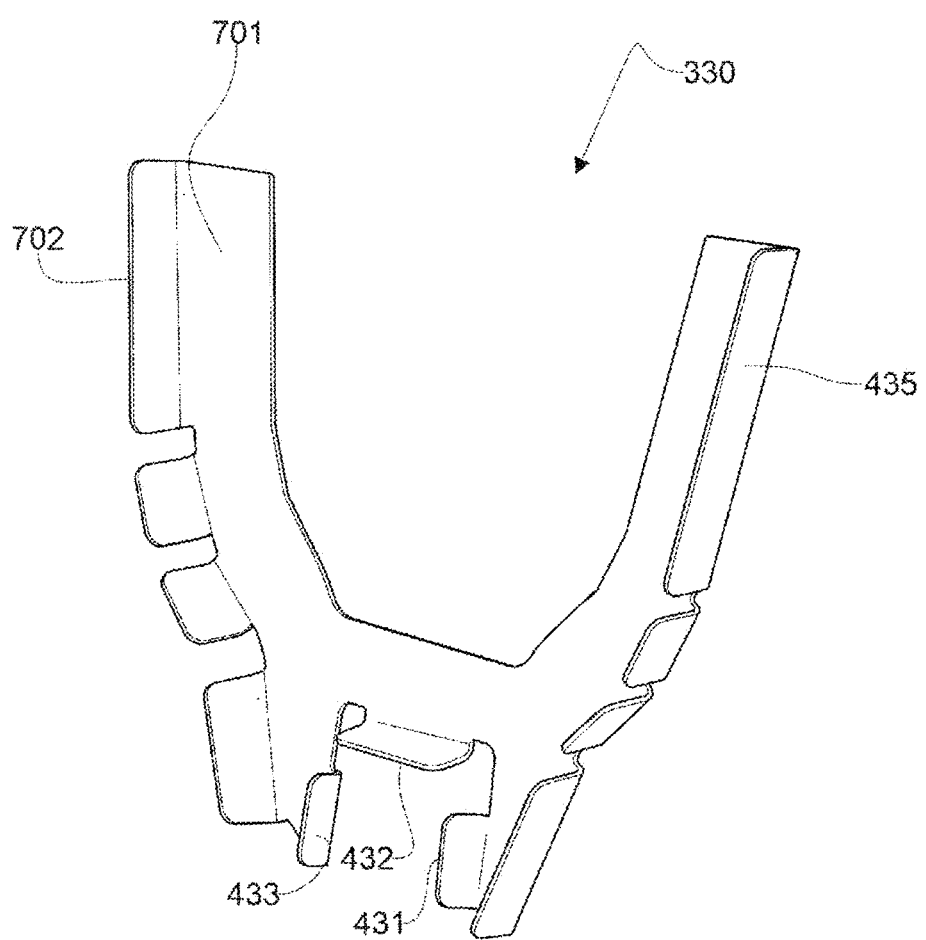
FIG. 7 is a perspective view of an exemplary embodiment or a frame.

FIG. 7 according to some embodiment a frame (303) comprises a web (701) the outer faces are part of flanges (702) integral and in turn-out from the web.

The brackets (431, 432, 43) may also be made integral with the web as flanges in-turn out from the web (701).

Such a frame may be made of a composite material comprising a polymer matrix with a fiber reinforcement ad may be obtained by RTM in a fibrous preform or by stamping of a thermoplastic composite blank.

The frame may also be made of an aluminum or a titanium alloy and obtained integral by forming method such as superplastic forming and machining.

Alternatively, the frame (330), whether made of a composite or a metallic material may be obtained by assembly.

The frames are positioned and assembled on flat faces of the composite beam by their brackets, which leaves great latitude on the shape of the fairing panels.

Also, as shown in FIG. 4 the overall horseshoe shape of the frames leaves a free space devoid of structural members inside the RSS between the inner faces of the fairing panels (340) and inbetween the inner sides of the frames' webs (701), where equipment may be installed.

During assembly, the frames are positioned on the composite beam using positioning tools and pining in pilot holes drilled in the frames and the composite beam.

The final affix of the frames on the composite beam may be carried out in counter-drilled holes, using HI-LITE™ (LISI AEROSPACE) type fasteners.

The fairing panels are then assembled to the frames.

Thus, compared to prior art, the number of assemblies and fasteners is drastically reduced.

Therefore, the proposed technical solution enables to make a lighter RSS (300), with a gain of about 30% in mass compared to prior art, with a more precise manufacturing, using fewer assemblies, while offering more flexibility in the choice of the shape of the fairing panels. Leasing to better aerodynamics, and with a larger free internal space, for the installation of more or of larger equipment while providing improved accessibility to this equipment.

The invention claimed is:

1. An engine pylon rear secondary structure for an aircraft comprising an engine pylon suspending an engine to a wing, the engine pylon rear secondary structure comprising:
 a front attachment interface, configured to be attached to a primary structure of the engine pylon;
 an aft attachment interface, configured to be attached to a primary structure of the wing;
 a one-piece composite beam comprising a second section connected to the front attachment interface and a first section connected to the aft attachment interface;
 the;
 the first section extends in a first medium plane and the second section extends in a second medium plane the first and the second medium planes being secant;
 the first section comprises a single branch and the second section comprises two branches the composite beam having a substantially Y shape, wherein a cross section of the first section and cross sections of each of the two branches of the second section are U-shaped;

further comprising frames, each frame comprising an outer face, the outer faces supporting fairing panels and being attached to the first section;

wherein each frame comprises three brackets configured to be attached to three external faces of the U-shaped cross-section of the first section.

2. The engine pylon rear secondary structure of claim 1, wherein the frames are of an overall horseshoe shape comprising a frame web and flanges, leaving a free space inbetween inner sides of the frames' webs.

3. The engine pylon rear secondary structure of claim 2, wherein the three brackets of a frame are flanges integral with the frame web.

4. The engine pylon rear secondary structure of claim 2, wherein the outer face of a frame is part of a flange integral with the frame web.

5. The engine pylon rear secondary structure of claim 1, wherein the outer face of the frames is configured to support fairing panels with a shape selected among planar panels, single-curvature panels and double-curvature panels.

6. The engine pylon rear secondary structure of claim 1, wherein the U-shaped cross-section of the first section of the composite beam widens from the aft attachment interface up to the second section.

7. The engine pylon rear secondary structure of claim 1, wherein the U-shaped cross-sections of the two branches of the second section are widening towards the front attachment interface.

8. The engine pylon rear secondary structure of claim 1, wherein the composite beam is made of a composite material comprising a polymer matrix and a reinforcement comprising continuous carbon fibers.

9. The engine pylon rear secondary structure of claim 1, wherein the frames are made of a material chosen among an aluminum alloy, a titanium alloy and a composite material comprising a polymer matrix and a reinforcement comprising continuous carbon fibers.

10. The engine pylon rear secondary structure of claim 1, wherein a fairing panel comprises an access hatch.

* * * * *